United States Patent [19]

Theodore et al.

[11] 4,292,225

[45] Sep. 29, 1981

[54] HIGHLY FILLED THERMALLY CONDUCTIVE ELASTOMERS IV

[75] Inventors: Ares N. Theodore, Farmington Hills; Marvin A. Lemieux, Southfield, both of Mich.

[73] Assignee: Ford Motor Company, Dearborn, Mich.

[21] Appl. No.: 109,439

[22] Filed: Jan. 4, 1980

[51] Int. Cl.³ ............................................. C08L 83/04
[52] U.S. Cl. ......................... 260/29.1 SB; 260/37 SB
[58] Field of Search .................... 260/37 SB, 29.1 SB; 528/31

[56] References Cited

U.S. PATENT DOCUMENTS

| | | | |
|---|---|---|---|
| 3,011,987 | 12/1961 | Walton | 260/18 SB |
| 3,098,836 | 7/1963 | Bobear | 260/37 SB |
| 3,177,238 | 4/1965 | Rince | 556/457 |
| 3,179,546 | 4/1965 | Fischer | 156/272 |
| 3,184,427 | 5/1965 | Russell et al. | 260/37 SB |
| 3,255,152 | 6/1966 | Kneige | 260/37 SB |
| 3,274,145 | 9/1966 | Dupree | 260/37 SB |
| 3,399,082 | 8/1968 | Henderson et al. | 260/37 SB |
| 3,499,859 | 3/1970 | Matherly | 260/37 SB |
| 3,506,607 | 4/1970 | Bobear | 260/37 SB |
| 3,676,420 | 7/1972 | Fulton et al. | 260/37 SB |
| 3,746,662 | 7/1973 | Adelman | 252/513 |
| 3,791,998 | 2/1974 | Bruns | 260/37 SB |
| 3,865,784 | 2/1975 | Neale et al. | 260/37 SB |
| 3,867,315 | 2/1975 | Tigner et al. | 260/37 M |
| 3,933,712 | 1/1976 | Vanaglash | 528/31 |
| 3,968,055 | 7/1976 | Palmer | 260/37 SB |
| 3,969,310 | 7/1976 | Itoh et al. | 260/37 SB |
| 3,970,504 | 7/1976 | Palmer | 260/37 SB |
| 4,009,043 | 2/1977 | Preis | 260/37 SB |
| 4,025,485 | 5/1977 | Kodama et al. | 260/37 SB |
| 4,026,835 | 5/1977 | Lee et al. | 260/37 SB |
| 4,026,868 | 5/1977 | Merrill | 260/37 SB |
| 4,069,083 | 1/1978 | Palmer | 260/33.6 SB |
| 4,070,329 | 1/1978 | Homan et al. | 260/37 SB |
| 4,075,154 | 2/1978 | Itoh et al. | 260/37 SB |
| 4,076,684 | 2/1978 | Wohlfarth et al. | 260/37 SB |
| 4,130,707 | 12/1978 | Leiser et al. | 528/15 |
| 4,148,354 | 4/1979 | Rao | 165/8 |

*Primary Examiner*—Lewis T. Jacobs
*Attorney, Agent, or Firm*—Lorraine S. Melotik; Roger L. May

[57] ABSTRACT

A thick, highly filled, shaped elastomeric body comprising a thermally conductive elastomer suitable for high temperature, e.g. 240°–260° C., mechanical applications. The elastomer composition comprises organopolysiloxane, particulates, and a viscosity modifier. The organopolysiloxane crosslinks between the vinyl or allyl functionality of an organopolysiloxane polymer and the silyl hydride functionality of an organopolysiloxane oligomer. The particulates comprise silica as well as a thermally conductive boron refractory powder, preferably boron nitride. The addition of a viscosity modifier comprising silicone oil is essential to the inclusion of the high levels of particulates.

9 Claims, No Drawings

HIGHLY FILLED THERMALLY CONDUCTIVE ELASTOMERS IV

Related commonly assigned applications filed concurrently with this application are U.S. application Ser. Nos. 109,440 entitled "Highly Filled Thermally Conductive Elastomers II" to Ares N. Theodore, 109,445 entitled "Highly Filled Thermally Conductive Elastomers I" to Ares N. Theodore et al, and 109,446 "Highly Filled Thermally Conductive Elastomers III" to Ares N. Theodore.

BACKGROUND OF THE INVENTION

Elastomers for use in rotary regenerator assemblies are known, e.g., see U.S. Pat. No. 4,148,354 which is herein hereby incorporated herein by reference. These assemblies comprise ceramic core surrounded by a steel ring gear with elastomer therebetween. The elastomer accomodates differential rates of expansion during assembly and during operation.

Materials proposed in U.S. Pat. No. 4,148,354, while satisfactory, do have certain deficiencies. For example, the materials may not function optimally under certain conditions for as long periods as might be desired.

A particularly acute problem is that these materials tend to degrade during extended high temperature service. Others have proposed certain filled organosiloxane and other organic polymers for use in making articles that resist degradation when exposed to extreme conditions. See, for example, U.S. Pat. Nos. 3,098,836; 3,255,152; 3,274,145; 3,506,607; 3,676,420; 3,746,662; 3,791,998; 3,865,784; 3,867,315; 3,911,045; 4,025,485; and 4,069,083. These patents show that desirable properties may result by loading certain organic polymers with inorganic particulate.

It has been discovered in accordance with this invention that besides enhancing certain physical properties as well as potentially reducing material costs, certain particulates also offer improved thermal stability. Improved thermal stability is insufficient by itself, however, to provide a more acceptable material for applications such as ring gear assemblies. Rather, such improved thermal stability, when provided by increased particulate loading, is accompanied typically by higher initial viscosities and shorter working times. The higher initial viscosities and shorter working times can make such materials undesirable for high volume production use.

Others (see U.S. Pat. No. 3,499,859) have suggested use of particulates such as boron nitride to make thermally conductive RTV rubbers.

As distinguished from U.S. Pat. No. 3,499,859, this invention relates to two component systems that do not require an inert atmosphere during compounding. Moreover, the aging characteristics of elastomers of this invention make them of particular value, not seen in the U.S. Pat. No. 3,499,859 disclosure.

It is an object of this invention to provide elastomers with improved thermal stability.

It is also an object of this invention to provide elastomers with improved thermal stability and whose precursors have desirable initial viscosities and working times.

It is an additional object of this invention to provide elastomer precursors for filling difficult to fill mold cavities.

It is even a still further object of this invention to provide improved elastomer for use in rotary regenerators comprising ceramic core surrounded by steel or other metal ring gear.

These and other objects have been accomplished with elastomers made in accordance with the hereinafter disclosed invention.

BRIEF DESCRIPTION OF THE INVENTION

This invention relates to highly filled, thermally conductive elastomers made from ingredients that include organopolysiloxanes and inorganic particulate. By admixing these and other essential ingredients in certain ways, there is provision of elastomer precursor compositions that readily fill difficult to fill mold cavities and yet, when cured, exhibit such physical and thermal properties as to make them admirably suited for high temperature, mechanical service.

In elastomer precursor compositions of this invention, crosslinking occurs between such functional groups as vinyl of one organopolysiloxane and such functional groups as silyl hydride

of another organopolysiloxane in the presence of catalyst and certain other ingredients. Among other ingredients are conductive boron ceramic particulates that contribute to high temperature stability and improved physical properties of the elastomer.

Certain viscosity modifiers serve to facilitate incorporation of high particulate levels into the elastomer precursors while at the same time permitting desired initial viscosities and working times. By selection and control of particulate size and amount as well as viscosity modifier type and amount, there is a net increase in thermal and physical properties. At the same time there is provision thereby of elastomer precursors with such initial viscosities and working times as to permit ready incorporation into difficult to fill mold cavities.

Surprisingly, even though the viscosity modifier is liquid and may be expected to be non-reactive, the amount of conductive particulate that it allows to be effectively incorporated gives elastomers which show even less high temperature weight loss than the same elastomers without any conductive particulate and viscosity modifier. Thus, the conductive particulate and liquid viscosity modifier combination in the elastomer acts, with respect to thermal aging, as if it were a more stable filled, crosslinked polymer than the filled, crosslinked organopolysiloxane polymer without such combination. With spherical or irregular shaped particulates (e.g. $L/D \leq 8$) as the powders of this invention, the above described benefit is particularly notable.

DETAILED DESCRIPTION OF THE INVENTION

The elastomers of this invention are made by intimately admixing a polymer containing base component (Component I) and an oligomer containing component (Component II). With admixture, the polymer and oligomer in the Components I and II crosslink at room temperature (or elevated temperature, if desired) to provide (with the other ingredients in the components)

thermally conductive elastomers. The ingredients of Components I and II preferably are as follows:

A. COMPONENT I.

Component I comprises 100 parts by weight of a crosslinkable polymer (Polymer I). Polymer I is of a formula corresponding to

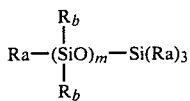

$$\text{Ra}-(\text{SiO})_m-\text{Si}(\text{Ra})_3 \qquad \text{I}$$
with $R_b$ substituents wherein at least most of the Ra's and Rb's are independently selected from (A) any one or more of 1. saturated hydrocarbyl groups of about 1–10 carbon atoms or 2. saturated hydrocarbyloxy groups having from 1 to about 10 carbon atoms that are alkyl or aryl or alkyl and aryl carbons; and (B) either or both allyl or vinyl which may be substituted by halo or saturated hydrocarbyl or hydrocarbyloxy groups having between about 1–8 carbon atoms that are alkyl or aryl or aryl and alkyl carbon atoms and wherein there are up to two of these substituents per vinyl or allyl. Up to about 25% (preferably up to 10%), however, of the total number of Rb's may correspond to the formula:

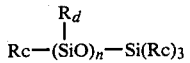

$$\text{Rc}-(\text{SiO})_n-\text{Si}(\text{Rc})_3 \qquad \text{I(a)}$$

wherein at least most of the Rc's and Rd's are selected from (A) and (B) above but up to about 10% (preferably 5%) of the total number of Rd's may contain additional siloxane units such as those of formula II above with substituents selected from (A) and (B) above or still additional siloxane units. Provided, however, that there is: (1) an average number of siloxane units (i.e. m plus all n's plus the total number of end groups) per polymer molecule between about 100 and 300 (preferably 150–250) and (2) an average of above about 1.5 but lower than 6 (preferably about 1.5–2.5) crosslinking sites selected from the vinyl, allyl or vinyl and allyl groups per polymer molecule. Preferably, m averages between about 170–220 and n is below 50. More preferably n is below 25 and less than 10% of the total Rb's are siloxane units. Also, preferably the vinyl or allyl groups are on end siloxane groups e.g., the vinyl or allyl groups in the position of Ra or Rc. Examples of the saturated hydrocarbyl and the hydrocarbyl of the saturated hydrocarbyloxy include: alkyl, aryl, alkaryl, aralkyl such as straight and branched alkyl, straight or branches alkyl substituted phenyl, phenyl, phenyl substituted straight or branched alkyl including for example methyl, ethyl, butyl, methylphenyl, phenylethyl etc. any of which may be substituted by normally unreactive substituents such as halo (e.g. chloro) or interrupted by oxy (-O-). Examples of commercially available polymers for Polymer I are Silastic J, E & L RTV silicone elastomers available from Dow Corning Corporation.

Especially preferred polymers for Polymer I of Component I correspond to the formula:

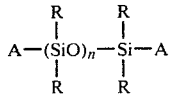

$$\text{A}-(\text{SiO})_n-\text{Si}-\text{A} \qquad \text{I'}$$

wherein each R is independently an aliphatic or aromatic or combination thereof of up to about 8 carbon atoms and is preferably $R'(O)_x$ wherein x is zero or one and R' is phenyl or alkyl of up to about 6 carbons (more preferably 3) or alkyl phenyl (or phenyl alkyl) having up to about 6 alkyl carbons (preferably up to 3 alkyl carbons); A is vinyl; and n has an average between about 150–200.

Component I also contains silica particulate intimately admixed with the Polymer I. The silica preferably is a combination of silicas comprising ground and fumed silicas. Preferably the weight ratio of silica to Polymer I is between about 0.3 to 2.5:1, more preferably between about 0.9:1 to 1:0.9.

The silica is desirably of small particle size so as to not only provide reinforcement but also impart thixotropic behavior to the compositions. Preferred Polymer I and silica admixtures have viscosities between about 500–1500 poises at 25° C.

As mentioned, it is preferred to have a combination of silicas comprising ground and fumed silica. Normally, the weight of ground silica such as those having an average (i.e. mean) diameter between about 0.1–15 (more preferably 0.5–10) microns will desirably far exceed the weight of fumed silica e.g. a weight ratio of 2:1 or more as preferably between about 5:1 to 19:1. The fumed silica (at an average particle diameter of between about 0.005–0.015 microns, more preferably between about 0.010 microns and 0.014 microns) provides reinforcement to the elastomer. The ground silica imparts better flow properties to the uncured elastomer composition. The balance of these two silica types then is of importance for control of desired elastomer precursor and cured elastomer properties.

Other inorganic particles that may be added include, for example, glass fibers, if additional reinforcement (especially improved hot tear resistance) of the elastomer is desired. Chopped fiber in lengths of between about 0.34 and 1.25 centimeters, especially between about 0.5–1 centimeters, are preferred. Improved adhesion of glass fiber in the cured thermally conductive elastomer can be accomplished through coating of the glass fibers with primers which are commercially available. For example, Dow Corning Primer Q 3-6061 (e.g. at 0.15 g primer to 1 kg glass fibers) diluted with methylene chloride may be used to pack and coat the glass fibers. Other fibers such as carbon, graphite, cellulose, and metal may be employed together with or in place of the glass fibers.

In addition, still other ingredients such as zinc oxide, lampblack and the like may be included in component I to improve heat stability and the like functions. Preferably, component I contains a metal (such as platinum) catalyst to reduce cure time and temperature. (See, for example, U.S. Pat. No. 4,076,684, col. 6, lines 49–68, col. 7, lines 1–2, and the paragraph bridging cols. 7 and 8 which are hereby incorporated herein by reference). A preferred catalyst is is a platinum complexed silicone oligomer. The oligomer may be of the structure of Polymer I but wherein m averages less than 50 e.g. 15 or less. Additionally it is preferred to use a modifier with these systems that slows increase in viscosity due to crosslinking e.g. snap time modifiers available from Dow Corning Corporation. Such modifiers are commercially available and are preferably vinyl silicones of up to 15 repeating siloxane units with desirably up to about 5 vinyl groups. These vinyl silicones serve to slow down the crosslinking reaction thereby slowing increase in viscosity. Other catalyst modifiers available for this purpose include quinoline, triphenyl phosphide, dimethyl sulfoxide, perchloroethylene, etc. known to those in the art. Other catalyst may also be used, e.g. peroxides, alkoxides and the like as well as modifiers as is well known in the art.

Essential to elastomers of this invention are boron refractory conductive powders which improve thermal properties of the elastomer. These powders preferably are of spherical or irregular shape as distinguished from fibrous with L/D greater than 3/1. Boron nitride constitutes a preferred boron refractory powder. Another boron refractory is boron carbide. Preferred boron nitride particles have an average largest dimension between about 10-350 microns, more preferably 10-250 microns.

Boron nitride particularly useful in this invention comprises flat ceramic platelets similar to graphite. The powder may be obtained by a number of procedures (e.g., see "Special Ceramics", proceedings of a symposium held at the British Ceramic Research Association, Editor P. Popper, 1960). A number of commercial sources are available for boron nitride, including, for example, Carbon Products Division of Union Carbide Corporation.

The boron refractory powders may be used with other powders such as graphites at any weight ratio, preferably between about 1:5-5:1, especially with particles of about the same size. The boron nitride aids thermal conductivity; the graphite aids processability.

The conductive powder is normally at a weight ratio to Polymer I of between about 0:3 to 2.5:1 (preferably about 0.5:1 to 2.0:1) powder to polymer.

Essential to the addition of high levels of conductive powders is inclusion of certain amounts of viscosity modifiers to control the initial apparent viscosity of these compositions. A careful balance between particulate including conductive powder and viscosity modifier is important to achieve high thermal conductivity without loss of viscosity modifier and consequent decrease in thermal stability and physical properties of the cured compounds. The viscosity modifier is normally at a weight ratio between about 1:20 to 1:4 (more preferably 1:10-1:2) viscosity modifier to the inorganic particulates of silica and conductive powder depending upon certain other features as amount and particle size of conductive powder and other particulates as well as viscosity modifier character.

The viscosity modifier preferably comprises a silicone oil having a viscosity of between about 1000-1,000,000 centistokes at 25° C., more preferably 5000-1,000,000 centistokes at 25° C. Preferred viscosity modifiers include those having a formula which corresponds to formula I above for Polymer I except that the vinyl group is replaced by groups similar to the others on the backbone, e.g. alkyl or alkoxy of between about 1-10 carbon atoms. Especially preferred viscosity modifiers are dimethyl silicone oils i.e. polymers of formula I above wherein at least most of the $R_a$'s and $R_b$'s are methyl and particularly wherein there is minimum branching e.g. wherein less than 10% of the Rb's are siloxane units. In addition to dimethyl silicone oils, however, other examples of silicone oils that may be used alone or in combination with dimethyl silicone oils include, for example, methyl phenyl silicone, branched methyl phenoxy silicone, branched chlorophenyl methyl silicone, flurosilicone, nitrile silicone, methyl hydrogen and methyl vinyl silicone oils.

Especially preferred viscosity modifiers correspond to the formula:

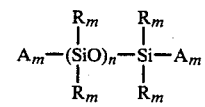

II wherein $R_m$ and $A_m$ comprise alkyl of 1-8 carbons or phenyl or phenyl substituted by alkyl or alkoxy of 1-8 carbons or halo such as chloro; and n is above about 15.

B. COMPONENT II.

Component II comprises an oligomer (hereinafter, Oligomer I) that crosslinks with Polymer I through the vinyl groups of Polymer I and silyl hydride groups of Oligomer I. Oligomer I preferably has a formula corresponding to that of formula I except that there are an average of more than 1 and less than about 20 silyl hydride groups

rather than any vinyl or allyl groups; the total number of siloxy groups (i.e. total of all m and n's) averages between about 5-50; and there is little, if any, branching e.g. less than about 5% of the Rb's are siloxane units. Examples of such oligomers include Silastic J curing agent available from Dow Corning Corporation.

Preferred oligomer crosslinking agents correspond to the formula:

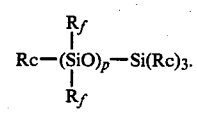

wherein Re and Rf are selected from hydrogen and saturated hydrocarbyl or hydrocarbyloxy of between about 1-10 carbon atoms optionally substituted by halo such as chloro or interrupted by oxy (—O—); p averages between 6-40 and wherein there is an average of at least about two silyl hydrides groups per polymer and up to about one for each siloxy group, more preferably an average between 5 and 15 silyl hydride groups per polymer chain.

Especially preferred crosslinking agents correspond to the formula:

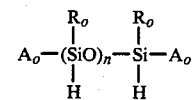

III' wherein $R_o$ is alkyl or alkoxy of 1-3 carbons, phenyl or phenoxy, preferably methyl; $A_o$ is alkyl or alkoxy of 1-3 carbon atoms or phenyl or phenoxy preferably, methyl; and n is between about 5-14 on the average.

The crosslinking agent is used at a weight ratio with respect to polymer I of between about 1:3 to 1:20 Polymer II to Polymer I, and preferably at least about 1:1 equivalent of silyl hydride for each equivalent of vinyl or other such aliphatic unsubstitution.

The elastomer precursor compositions of this invention also may contain such other ingredients which are typically included in compositions of the type disclosed herein, e.g., dyes, pigments, heat stabilizers, antioxidants, adhesion promotors, uv absorbers and the like.

The following procedures are used in the examples below to determine working time and physical and thermal properties:

WORKING TIME

After de-aeration some of mix is poured in a 100 ml. beaker for determination of working time with the Brookfield viscometer. A #4 spindle at 0.6 rpm is used for this measurement with the guard in its proper place. The time required for the spindle to move from the starting point to 100 on the instrument scale is called the working time of a composition.

A. PHYSICAL PROPERTIES

1. Tensile testing of dumbbell specimens:

ASTM D 412 procedure is used for determinatin of tensile strength, 10% modulus and elongation to break. Dumbbell specimens are cut with the standard die from a thin slab (0.32 cm thick) and used for this testing.

2. Durometer Hardness:

The hardness of cured silicone rubber is determined according to ASTM D 2240 procedure.

3. Tear Testing:

Tear specimens, cut with a die B, are tested according to ASTM D 624 procedure. Razor-nicked specimens are used for determination of tear resistance.

B. COEFFICIENTS OF THERMAL EXPANSION:

The coefficients of thermal expansion are determined with the Dupont 942 thermomechanical analyzer. Sensitivity of this instrument is checked with an aluminum metal standard. Sample height is 0.60 cm and temperature was programmed at 5° C./mm. In all cases the expansion probe is resting on molded surfaces and has zero load. The coefficients of expansion are calculated for the temperature ranges of 25°–300° C. and 200°–300° C.

C. DETERMINATION OF THERMAL CONDUCTIVITIES:

The split bar method is used for determining the thermal conductivities of these elastomeric materials. Two specimens are used for these measurements and an average of thermal conductivity is obtained from the two samples. Typical dimensions of thin specimens are 2.14 cm(W)×4.80 cm(L)×0.210 cm(T) and for thick specimen 2.15 cm(W)×4.80 cm(L)×0.65 cm(T). Measurements on two samples of different thickness are used to eliminate temperature drops due to the interfaces between the specimen and copper rod.

The Examples below are intended to illustrate this invention and not necessarily limit its scope.

EXAMPLE 1

The base RTV silicone elastomer materials is prepared by mixing the following ingredients in a Hobart mixer:

| Component | Amount |
| --- | --- |
| 1. Silastic J RTV Silicone Elastomer and Silica Particulate[1] | 2494.80 |
| 2. Kadox 15 ZnO | 15.60 |
| 3. Williams 1011 Lampblack | 7.80 |
| 4. Glass Fibers (¼ In. Chopped Strand Coated with Primer) | 27.50 |

After mixing the above ingredients for five minutes, this base material was stored for use in preparation of thermally conductive elastomers.

In compounding the thermally conductive silicone elastomers, the above base material is combined with the ingredients below in the following manner:

| Component | Amount |
| --- | --- |
| 1. Base Material | 400.00 grams |
| 2. Boron nitride (diameter: 48–90 Microns) | 100.00 grams |
| 3. Silicone Fluid 200 (100,000 centistokes at 25°) | 40.00 grams |
| 4. Silastic J Curing Agent | 40.00 grams |
| 5. Cure Modifier E-1990-76 | 0.80 grams |

The silastic J RTV silicone elastomer (base material) and boron nitride powder are charged in a Ross double planetary mixer. The addition of silicone fluid 200 follows with mixing for 4 minutes. The mix is scrapped off in middle of mixing chamber for better mixing. Then the silastic J curing agent and cure modifier are added to the mixture and mixing is completed in six more minutes. After de-aeration of mix for 30 minutes, it is ready for molding and determination of working time with the Brookfield Viscometer (Model LV). The working time of mixture is over in 15 hours.

Molding of mix is carried out by pouring and spreading the mixture in a four cavity, chrome-plated mold kept at ambient temperature. After curing the compound for 20 minutes (top platten of hydraulic press at 232° C. and bottom at ambient temperature) under 70 ton pressure, the rubber slabs are taken out of mold and post cured in an air circulating oven for 3 hours at 202° C. (Alternately, the mixture can be cured at room temperature for 24–48 hours).

The molded articles exhibited the following physical properties before and after aging* at 260° C. for 500 hours.

| Test Temp. | Hardness Shore A | Modulus at 10% Elong. MPa | Tensile Strength MPa | Tear Strength KN/M | Elongation % |
| --- | --- | --- | --- | --- | --- |
| 25° C. | 65 | 0.82 | 3.00 | 12.90 | 56 |
| 232° C. | 65 | 0.93 | 1.77 | 6.20 | 26 |
| 232° C.* | 70 | 1.01 | 1.44 | 3.90 | 16 |

There is good retention of physical properties on aging at 260° C. for 500 hours. The weight loss on aging is small (4.4 vs 6.0) compared to silicone materials without boron nitride. The thermal conductivity of molded, rectangular shape is $9.53 \times 10^{-4}$ cal·sec.$^{-1}$ cm$^{-\cdot °C-1}$. The addition of conductive filler to the elastomer compositions shows no negative effects and substantially increases the thermal conductivity of base elastomer material. Improvements in thermal expansion are also found.

(1) The silica particulate of the base material is about 1093 parts by weight ground silica (Min-U-Sil) and about 58 parts by weight fumed silica (Cab-O-Sil MS-75). Min-U-Sil is a white powder with particles having an average diameter of about 5 microns and a specific gravity of about 2.65. Cab-O-Sil MS-75 has a specific gravity of 2.2 and an average particle diameter between about 0.07–0.1 microns. The base material further includes less than about 10 parts by weight of a platinum complex catalyst which is a vinyl siloxane oligomer modified by platinum metal (available from Dow Corning). The base material with these ingredients has a viscosity between 700–1300 poises at 25° C.

EXAMPLE 2

The base material prepared as described in Example 1 is compounded with the following ingredients as in Example 1.

| Component | Amount |
| --- | --- |
| 1. Base Material | 400.00 grams |
| 2. Boron Nitride (Particle Diameter 48–90 Micron) | 140.00 grams |
| 3. Silicone Fluid #200 (100,000 centistokes at 25° C.) | 40.00 grams |
| 4. Silastic J Curing Agent | 40.00 grams |
| 5. Cure Modifier E-1990-76 | 0.80 grams |

After mixing all ingredients in a Ross double planetary mixer as in Example 1, the compound has a working time of 11.0 hours.

Articles molded according to procedure of Example 1 exhibit good physical properties before and after aging at 260° C. for 500 hours. Higher thermal conductivities and lower weight losses are also found.

EXAMPLE 3

Example 1 is repeated with the exception that the weight of boron nitride is lowered (75.00 grams, 48–90 microns). After mixing all ingredients on a 80×180 mm two-roll vented research mill, the compound has a working time of over 20.0 hours.

Specimens molded under the same conditions as materials of Example 1 exhibit good physical properties. Lower weight loss on aging and improvements in thermal conductivity are found.

EXAMPLE 4

The base RTV silicone material prepared as described in Example 1 is combined with the following ingredients according to mixing procedure and equipment of Example 1.

| Component | Amount |
| --- | --- |
| 1. Base Material (RTV Silicone Elastomer | 400.00 grams |
| 2. Boron nitride (Particle Diameter 25–30 Microns) | 100.00 grams |
| 3. Silicone Fluid #200 (100,000 centistokes at 25° C.) | 40.00 grams |
| 4. Silastic J Curing Agent | 40.00 grams |
| 5. Cure Modifier E-1990-76 | 0.80 grams |

Upon completion of mixing, the mix has a working time of less than one hour.

Articles molded according to Example 1 exhibit the following properties before and after aging* at 260° C. for 500 hours:

| Test Temp. | Hardness Shore A | Modulus at 10% Elong. MPa | Tensile Strength MPa | Tear Strength KN/M | Elongation % |
| --- | --- | --- | --- | --- | --- |
| 25° C. | 68 | 1.24 | 3.09 | 12.50 | 46 |
| 232° C. | 68 | 1.10 | 2.19 | 6.10 | 22 |
| 232° C.* | 77 | 1.44 | 1.76 | 3.75 | 13 |

Molded specimens exhibit lower weight losses (4.9%) than materials without boron nitride. The thermal conductivity of these articles ($13.90 \times 10^{-4}$ cal·sec.$^{-1}$·cm$^{-1}$·°C.$^{-1}$) is over three times higher than values of material without the conductive filler. The expansion characteristics are also improved.

EXAMPLE 5

Example 4 is repeated with the exception that lower amounts of boron nitride were used (80 grams, 25–30 microns boron nitride). After mixing according to procedure of Example 1. The mixture had a working time of less than 2.0 hours.

Molded specimens according to procedure of Example 1 had good physical properties before and after aging at 260° C. for 500 hours. These materials showed improvements in thermal conductivity and lower weight loss on aging.

EXAMPLE 6

The base silicone elastomer prepared as described in Example 1 is mixed with the following ingredients as in Example 1.

| Component | Amount |
| --- | --- |
| 1. Base Material | 500.00 grams |
| 2. Boron Nitride (Particle Diameter 25–30 Microns) | 125.00 grams |
| 3. Silicone Fluid #200 (100,000 centistokes at 25° C.) | 65.00 grams |
| 4. Silastic J Curing Agent | 60.00 grams |
| 5. Cure Modifier E-1990-76 | 1.00 grams |

After mixing the ingredients, the mix had a working time of about 3 hours.

Molded specimens according to procedure of Example 1 exhibit good physical properties and improvements in thermal conductivity.

EXAMPLE 7

Example 6 is repeated with the exception that a larger amount of silicone fluid #200 is used (90.0 grams silicone fluid #200). The mixture has longer working time and was moldable.

EXAMPLE 8

The base material (RTV silicone base) described in Example 1 is mixed with the following ingredients according to procedure of Example 1.

| Component | Amount |
| --- | --- |
| 1. Base Material | 400.00 grams |
| 2. Boron Nitride (Particle Diameter 48–90 Microns) | 50.00 grams |
| 3. Boron Nitride (Particle Diameter 25–30 Microns) | 50.00 grams |
| 4. Silicone Fluid #200 (100,00 centistokes at 25° C.) | 40.00 grams |
| 5. Silastic J Curing Agent | 40.00 grams |
| 6. Cure Modifier E-1990-76 | 0.80 grams |

After mixing the above components, the mixture has a working time of over 4 hours.

Molded specimens according to procedure of Example 1 show improvements in thermal conductivity and have good physical properties.

EXAMPLE 9

Example 8 is repeated with the exception that 70 gms. of boron nitride (particle diam. 48–90 microns) are used for preparing the mixture. The mix has a working time of over 3 hours. It shows good thermal conductivity.

EXAMPLE 10

Example 1 is repeated with the exception that 180 gms. of boron nitride (particle diameter 48-90 microns) is used for preparation of mixture. The compound is moldable and exhibit good thermal conductivity.

EXAMPLE 12

The base of Example 1 is combined with the following ingredients according to procedure of Example 1.

| Component | Amount |
|---|---|
| 1. Base Material | 400.00 grams |
| 2. Boron Nitride (25-30 Microns) | 100.00 grams |
| 3. Silicone Fluid (30,000 centistokes at 25° C.) | 40.00 grams |
| 4. Silastic J Curing Agent | 40.00 grams |
| 5. Cure Modifier E-1990-76 | 0.80 grams |

After combining the ingredients, the mixture is moldable.

EXAMPLE 13

Example 1 was repeated with the exception that another size grade (on 20 mesh-none, on 325 mesh-90%) of boron nitride is used for preparing the mixture. Upon mixing the compound is moldable and has good properties.

EXAMPLE 14

Examples 1, 2 and 3 are repeated with the exception that 0.6 grams of cure modifier E-1990-76 are used in compounding the ingredients. Similar results are seen.

EXAMPLE 15

Examples 4, 5 and 6 are repeated with the exception that 1.6 grams of cure modifier E-1990-76 are used for preparing the mixture. Similar results are obtained.

EXAMPLE 16

In Examples 1-5 silastic J RTV silicone elastomer is replaced by silastic L&E. Similar results are obtained.

In the above Examples 1-16 the Silicone Fluid #200 (viscosity modifier) is a silicone fluid number designation of fluid available from the Dow Corning Corporation. Silicone fluid designated by viscosity are also available from Dow Corning.

The Silastic J, E and L (i.e. crosslinking polymer) as well as Silastic Curing Agent (i.e. crosslinking oligomer) and Cure Modifier E- 1990-76 are also available from the Dow Corning Corporation.

Information on the Silicone Fluid #200 used in the above Examples may be obtained from Form No. 22-069C-76 of Dow Corning Corp. Information on Silicone Fluid #705 (Dow Corning 705 Diffusion Pump Fluid described as pentaphenylmethyltrisiloxane) used in the above Examples may be had from Bulletin 22-287 date 8/74 from Dow Corning Corp. Information on Silastic J RTV Silicone Elastomer (and curing agent) used in the above Examples may be obtained from Form No. 61-080A-76 of Dow Corning Corp. Information on Silastic E and L elastomers used in the above Examples may be obtained from Form No. 61-326-76 of Dow Corning Corp. These ingredients are all deemed within the scope of the invention as hereinbefore disclosed.

It is to be understood that the organosiloxanes as hereinbefore described by formula (e.g. formula I, I', II, etc.) may contain minor amounts of siloxane impurities (e.g. up to about 20 weight percent) which do not correspond to the formula as set forth and still be within the scope of this invention.

What is claimed is:

1. A thick, highly filled elastomer body made by filling a cavity with a dispensible elastomer precursor, which precursor consists essentially of:
   I. 100 parts by weight of an olefinically unsaturated crosslinkable polysiloxane having the formula:

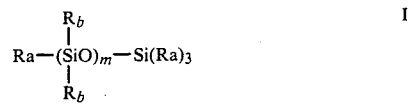

wherein at least most of the Ra's and Rb's are selected from (A) saturated hydrocarbyl or hydrocarbyloxy groups having 1 to about 10 carbon atoms that are alkyl or aryl or alkyl and aryl and (B) allyl or vinyl groups but wherein up to about 25% of the Rb's may be

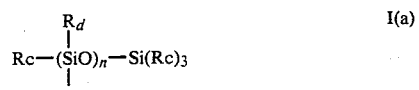

wherein at least most of the Rc's and Rd's are selected from (A) and (B) above but up to about 10% of the Rd's may contain additional siloxane units with substituents selected from (A) and (B) or still additional siloxane units; and still further wherein (1) the average number of siloxane units per polymer molecule is between 100 and 300 and (2) there is an average of above about 1.5 but lower than 6 crosslinking sites selected from the vinyl, allyl or vinyl and allyl groups per polymer molecule;
   II. about 60-500 parts by weight of finely divided particulate comprising:
   (A) silica particulate at a weight ratio to the polysiloxane of I. of between about 0.3 to 2.5:1 wherein the silica particulate comprises:
      1. ground silica having an average particule diameter between about 0.1 and 15 microns; and
      2. fumed silica having an average particule diameter between about 0.005 and 0.015 microns;
   (B) conductive boron refractory particulate at a weight ratio to the polysiloxane of I. of between about 0.3: 1 to 2.5:1;
   III. a viscosity modifier comprising a silicone oil having a viscosity between about 5000-1,000,000 centistokes at 25° C. at a weight ratio to the particulate of II of between about 1:20-1:4 oil to particulate; and
   IV. a silyl hydride functional polysiloxane oligomer containing between about 5-50 siloxane groups that crosslinks with I at a weight ratio with respect to the polysiloxane of I. of between about 1:3 to 1:20, the silyl hydride functional polysiloxane oligomer having an average of up to about 20 silyl hydride groups per polymer chain.

2. The elastomeric body in accordance with claim 1 wherein the crosslinkable polysiloxane is substantially free of branching.

3. The elastomeric body in accordance with claim 1, wherein the viscosity modifier comprises a dialkylpolysiloxane.

4. The elastomeric body in accordance with claim 3 wherein I (B) is vinyl.

5. The elastomeric body in accordance with claims 1 or 2 or 3 or 4 wherein the conductive powder comprises a boron nitride refractory particulate.

6. The elastomeric body in accordance with claim 5, wherein the silicone oil is selected from the group consisting of dimethyl silicone, methyl phenyl silicone, branched methyl phenoxy silicone, branched chlorophenyl methyl silicone, fluorosilicone, nitride silicone, methyl hydrogen silicone and methyl vinyl silicone oils.

7. The elastomeric body in accordance with claim 5 wherein the silyl hydride functional polysiloxane has the formula:

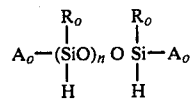

wherein n averages between about 5 and about 14, $R_o$ and $A_o$ are selected from the group consisting of alkyl or alkoxy groups having 1–3 carbons, phenyl and phenoxy groups.

8. The elastomeric body in accordance with claims 1 or 2 or 3 or 4 wherein the weight ratio of II. (A) to II. (B) is greater than about 2:1.

9. The elastomeric body in accordance with claim 8, wherein the weight ratio of silica to the polysiloxane of I. is between about 0.9:1 to 1:0.9.

* * * * *